United States Patent
Park

(10) Patent No.: US 12,333,139 B2
(45) Date of Patent: Jun. 17, 2025

(54) MEMORY SYSTEM AND OPERATING METHOD THEREOF

(71) Applicant: SK hynix Inc., Icheon-si (KR)

(72) Inventor: Sung Jin Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 108 days.

(21) Appl. No.: 17/959,947

(22) Filed: Oct. 4, 2022

(65) Prior Publication Data
US 2023/0289059 A1 Sep. 14, 2023

(30) Foreign Application Priority Data
Mar. 14, 2022 (KR) .......... 10-2022-0031417

(51) Int. Cl.
*G06F 3/06* (2006.01)
(52) U.S. Cl.
CPC .......... *G06F 3/0604* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 6,552,933 B2* | 4/2003 | Roohparvar | ......... | G11C 16/225 365/195 |
| 7,219,294 B2* | 5/2007 | Vogt | .............. | G06F 11/1004 714/758 |
| 9,489,253 B2* | 11/2016 | Cha | ................ | G06F 11/10 |
| 10,180,873 B2* | 1/2019 | Yoo | ................ | G06F 11/0751 |
| 10,331,586 B2* | 6/2019 | Seo | ................ | G06F 13/1673 |
| 2007/0028146 A1* | 2/2007 | Ruckerbauer | ...... | G11C 7/24 711/100 |
| 2007/0050612 A1* | 3/2007 | Chen | .............. | G06F 11/1433 713/100 |
| 2008/0288767 A1* | 11/2008 | Wang | ............. | G06F 11/1417 713/2 |

FOREIGN PATENT DOCUMENTS

KR 101102136 B1 1/2012
KR 1020160122330 A 10/2016

* cited by examiner

*Primary Examiner* — Elias Mamo
(74) *Attorney, Agent, or Firm* — Perkins Coie LLP

(57) ABSTRACT

A memory system includes a non-volatile memory device structured to store data; and a controller in communication with the non-volatile memory device to control writing data in, and reading data from, the non-volatile memory device, and including a memory, wherein the controller is configured to check, in response to a status data transmission request provided from an external device, whether an update flag indicating any update of status data stored in the memory is in a set status, and is configured to store the status data into the non-volatile memory device according to a status of the update flag.

17 Claims, 13 Drawing Sheets

MEMORY SYSTEM AND OPERATING METHOD THEREOF

PRIORITY CLAIM AND CROSS-REFERENCES TO RELATED APPLICATION

This patent document claims the priority and benefits of Korean application number 10-2022-0031417, filed on Mar. 14, 2022, in the Korean Intellectual Property Office, which is incorporated herein by reference in its entirety as set forth in full.

TECHNICAL FIELD

Various embodiments of the disclosed technology are related to a memory system, and more particularly, to a memory system including a non-volatile memory device.

BACKGROUND

A memory system may be configured to store data provided by a host device in response to a write request from the host device. Furthermore, the memory system may be configured to provide stored data to the host device in response to a read request from the host device. The host device is an electronic device capable of processing data and may include a computer, a digital camera or a mobile phone. The memory system may be mounted in the host device or may be fabricated to be capable of being connected to and detached from the host device.

The memory system may include a non-volatile memory device. The memory system may back up, into the non-volatile memory device, important data required for the operation thereof. Unnecessary and frequent back-up may cause the performance degradation of the memory system and the lifetime decrease of the non-volatile memory device.

SUMMARY

In an embodiment, a memory system is provided to include a non-volatile memory device structured to store data; and a controller in communication with the non-volatile memory device to control writing data in, and reading data from, the non-volatile memory device, and including a memory, wherein the controller is configured to check, in response to a status data transmission request provided from an external device, whether an update flag indicating any update of status data stored in the memory is in a set status, and is configured to store the status data into the non-volatile memory device according to a status of the update flag.

In an embodiment, a memory system is provided to include a non-volatile memory device structured to store data; and a controller in communication with the non-volatile memory device to control writing data in, and reading data from, the non-volatile memory device and configured to provide, in response to a status data transmission request provided from an external device, current status data to the external device, configured to store the current status data into the non-volatile memory device when the current status data is different from previous status data that is previously provided to the external device, and configured not to store the current status data into the non-volatile memory device when the current status data is same as the previous status data.

In an embodiment, an operating method of a memory system is provided. The method includes checking, in response to a status data transmission request provided from an external device, whether an update flag is in a set status, the update flag indicating any update of status data stored in a memory included in the memory system; and determining, according to a status of the update flag, whether to store the status data into a non-volatile memory device.

In an embodiment, a controller may include a memory and configured to check, in response to a status data transmission request provided from a first external device in communication with the controller, whether an update flag indicating any update of status data stored in the memory is in a set status and configured to store the status data into a second external device in communication with the controller according to a status of the update flag.

DETAILED DESCRIPTION

Exemplary embodiments of the present disclosure will be described below in more detail with reference to the accompanying drawings. The present disclosure may, however, be embodied in different forms and should not be construed as limited to the embodiments set forth herein.

The drawings are not necessarily to scale and, in some instances, proportions may have been exaggerated in order to clearly illustrate features of the embodiments.

Hereinafter, exemplary embodiments of the present disclosure will be described below with reference to the accompanying drawings.

In accordance with an embodiment, provided may be a memory system capable of effectively backing up important data, and an operating method of the memory system.

Figure 1:
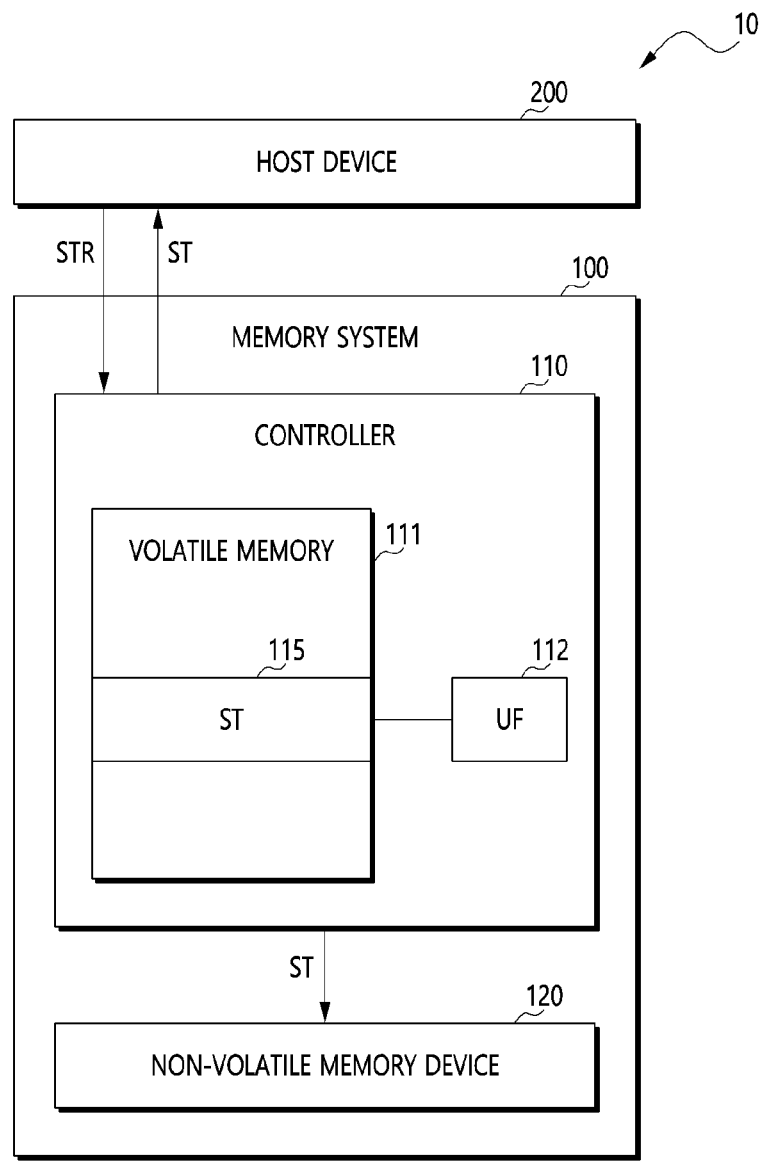
FIG. 1 is a block diagram illustrating a data processing system including a memory system in accordance with an embodiment.

FIG. 1 is a block diagram illustrating a data processing system including a memory system 100 in accordance with an embodiment.

The data processing system 10 may include a host device 200 and the memory system 100.

The host device 200 may be an electronic device capable of processing data and may include a computer, a digital camera, a mobile phone and so forth. In order to store data into the memory system 100 and read data from the memory system 100, the host device 200 may control the memory system 100. The host device 200 may belong to an external separate from the memory system 100.

The memory system 100 may be configured to store therein data, which is provided from the host device 200, in response to a write request from the host device 200. The memory system 100 may be configured to provide the host device 200 with data, which is read therefrom, in response to a read request from the host device 200.

The memory system 100 may be configured as a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid state drive (SSD).

The memory system 100 may include a controller 110 and a non-volatile memory device 120.

The controller 110 may control an overall operation of the memory system 100. The controller 110 may control the non-volatile memory device 120 in order to perform a foreground operation in response to an instruction from the host device 200. The foreground operation may include operations that are performed in response to instructions from an external device such as the host device. For example, the foreground operation may include a writing operation writing data in the non-volatile memory device 120 in response to a write request received from the host device 200 and a reading operation reading data from the non-volatile memory device 120 in response to a read request received from the host device 200.

In some implementations, the controller 110 may control the non-volatile memory device 120 in order to perform a background operation independently of the host device 200. The background operation may refer to an operation performed within the non-volatile memory device 120 without an intervention of the host device 200. The background operation may include at least one of a wear-leveling operation, a garbage collection operation, an erase operation, a read reclaim operation and a refresh operation for the non-volatile memory device 120. The background operation may include operations of writing data in the non-volatile memory device 120 and reading data from the non-volatile memory device 120 although such writing and reading operations are performed without the write request and the read request from the host device 200.

The controller 110 may include a volatile memory 111 and an update flag region 112.

The volatile memory 111 may operate as an operating memory, a buffer memory or a cache memory of the controller 110. In the example, the volatile memory 111 as an operating memory may store therein various program data and software program to be driven by the controller 110. The volatile memory 111 as a buffer memory may buffer data to be transferred between the host device 200 and the non-volatile memory device 120. The volatile memory 111 as a cache memory may cache data.

The volatile memory 111 may include at least one of a Dynamic Random Access Memory (DRAM), a Static Random Access Memory (SRAM), or other storages.

The volatile memory 111 may include a status data region 115. The status data region 115 may correspond to a predetermined address range within the volatile memory 111. The status data region 115 may store status data ST.

The controller 110 may store status data ST into the status data region 115 and may update the status data ST stored in the status data region 115 whenever required during an operation. The controller 110 may update status data ST stored in the status data region 115 by overwriting the stored status data ST with the update version of the status data ST.

The status data ST may include various information on the status of the memory system 100. For example, the status data ST may include various information such as error information of the memory system 100, recovery information of the memory system 100, lifetime information of the memory system 100, available storage capacity information of the memory system 100, information on accumulated amount of write data of the memory system 100, bad region information of the memory system 100, power information of the memory system 100, a response time of the memory system 100 for a request from the host device 200, a process time of the memory system 100 for a request from the host device 200, a delay time of the memory system 100 for a request from the host device 200, a response time of the non-volatile memory device 120, a process time of the non-volatile memory device 120, a delay time of the non-volatile memory device 120, and/or other various information. For example, the status data ST may include data of Self-Monitoring, Analysis and Reporting Technology (SMART). The controller 110 may receive a status data transmission request STR from the host device 200. In response to the status data transmission request STR, the controller 110 may provide the host device 200 with status data ST that is currently stored in the status data region 115.

The status data ST is supposed to provide consistency to the host device 200 and supposed to be stably secured. Therefore, for the consistency and security of the status data ST, the controller 110 may back up, into the non-volatile memory device 120, status data ST that is transferred to the host device 200 whenever receiving a status data transmission request STR from the host device 200. However, such back-up requires an unnecessary and frequent write operation, which may cause the performance degradation of the memory system 100 and the lifetime decrease of the non-volatile memory device 120. In an embodiment, unnecessary back-up of status data ST may be effectively suppressed, which leads to improve the performance of the memory system 100 and the lifetime increase of the non-volatile memory device 120.

In some implementations, the controller 110 may store an update flag UF into the update flag region 112. The controller 110 may set the update flag UF when updating status data ST stored in the status data region 115 and may clear (e.g., initialize) the update flag UF when storing (e.g., backing up) the status data ST into the non-volatile memory device 120. For example, the update flag UF may have a value of '1' when being set and may have a value of '0' when being cleared.

In response to a status data transmission request STR provided from the host device 200, the controller 110 may check whether the update flag UF is set or not and may store status data ST, which is stored in the status data region 115, into the non-volatile memory device 120 according to the status of the update flag UF. For example, when the update flag UF is set, the controller 110 may store status data ST, which is stored in the status data region 115, into the non-volatile memory device 120.

In some implementations, in response to the status data transmission request STR provided from the host device 200, the controller 110 may check whether the update flag UF is set or not and may not store status data ST, which is stored in the status data region 115, into the non-volatile memory device 120 when the update flag UF is cleared.

In response to the status data transmission request STR, the controller 110 may provide the status data ST to the host device 200.

In an embodiment, the update flag region 112 and the status data region 115 may be hard-wired to each other. In this case, the separate signal line coupled between the update flag region 112 and the status data region 115 may detect the write-access to the status data region 115 to set the update flag UF stored in the update flag region 112. When the update flag UF becomes hardware-wise set using the hardware configuration as described above, the overhead may be minimized.

In an embodiment, the update flag UF may be software-wise set using software. For example, the update flag UF may become set as an operation code for updating the status data ST is executed and then an operation code for setting the update flag UF is executed.

In an embodiment, the update flag region 112 may not be separated from the volatile memory 111 and may be included in the volatile memory 111, which is different from the illustration of FIG. 1.

In an embodiment, after the memory system 100 is powered on, the controller 110 may load previous status data from the non-volatile memory device 120 into the status data region 115 and then may clear the update flag UF. The previous status data may be the last status data ST that was stored in the non-volatile memory device 120 before the memory system 100 was previously powered off. In a case that the memory system 100 initially operates after the fabrication thereof, initial status data that is stored in the non-volatile memory device 120 during the fabrication may be loaded into the status data region 115.

In an embodiment, during a power-off process, the controller 110 may store the status data ST into the non-volatile memory device 120 when the update flag UF is set.

In some implementations, the controller 110 may provide the status data ST to the host device 200 in response to the status data transmission request STR provided from the host device 200. When the status data ST is one updated from previous status data previously provided to the host device 200 and stored in the non-volatile memory device 120, i.e., when the status data ST is different from the previous status data, the controller 110 may store the status data ST into the non-volatile memory device 120. When the status data ST is not updated from the previous status data, i.e., when the status data ST is the same as the previous status data, the controller 110 may not store the status data ST into the non-volatile memory device 120.

Based on the control of the controller 110, the non-volatile memory device 120 may store therein data provided from the controller 110 and may read data stored therein to provide the read data to the controller 110. Based on the control of the controller 110, the non-volatile memory device 120 may store therein the status data ST. Thus, the status data ST may be backed up into the non-volatile memory device 120.

The non-volatile memory device 120 may include a flash memory device (e.g., the NAND Flash or the NOR Flash), the Ferroelectrics Random Access Memory (FeRAM), the Phase-Change Random Access Memory (PCRAM), the Magnetic Random Access Memory (MRAM), the Resistive Random Access Memory (ReRAM), or other storages.

The non-volatile memory device 120 may include one or more planes, one or more memory chips, one or more memory dies or one or more memory packages.

Figure 2:
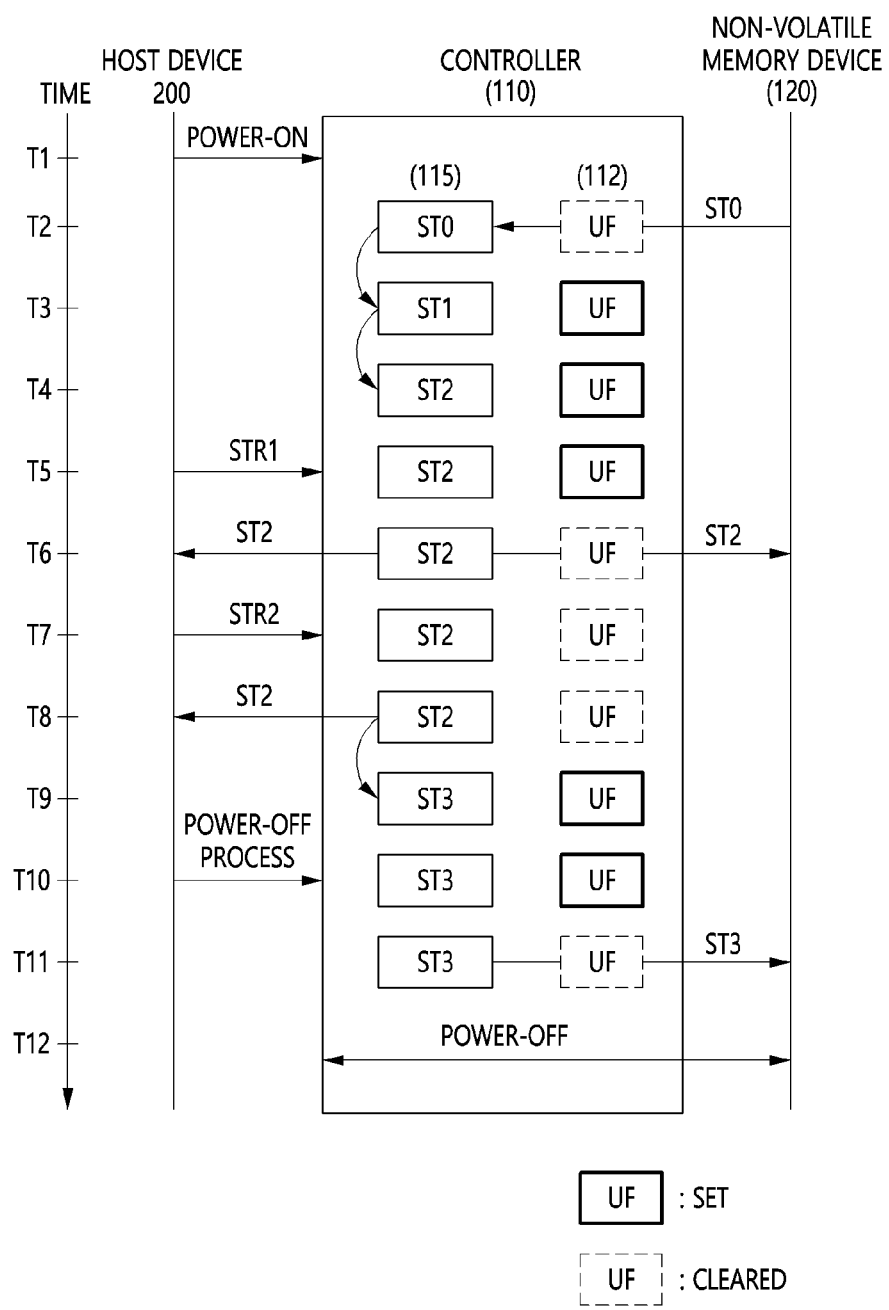
FIG. 2 is a diagram illustrating an operation of the memory system of FIG. 1 in accordance with an embodiment.

FIG. 2 is a diagram illustrating an operation of the memory system 100 of FIG. 1 in accordance with an embodiment.

Referring to FIG. 2, the memory system 100 may be powered on under the control of the host device 200 at a time point T1.

At a time point T2, the controller 110 may load previous status data ST0 from the non-volatile memory device 120 into the status data region 115 and may clear the update flag UF. The update flag UF that is cleared may indicate that the previous status data ST0 stored in the status data region 115 is also stored in the non-volatile memory device 120.

At a time point T3, the controller 110 may update, to a first status data ST1, the previous status data ST0 stored in the status data region 115 and may set the update flag UF. The update flag UF that is set may indicate that the first status data ST1 stored in the status data region 115 is one updated from the previous status data ST0 stored in the non-volatile memory device 120. In this case, the update flag UF that is set may indicate that the first status data ST1 stored in the status data region 115 is different from the previous status data ST0 stored in the non-volatile memory device 120. The update flag UF that is set may indicate that the first status data ST1 stored in the status data region 115 is not stored in the non-volatile memory device 120.

At a time point T4, the controller 110 may update, to a second status data ST2, the first status data ST1 stored in the status data region 115. Here, the update flag UF that is set at the time point T3 may be in the set status. The update flag UF that is in the set status may indicate that the second status data ST2 stored in the status data region 115 is different from the previous status data ST0 stored in the non-volatile memory device 120. The update flag UF that is in the set status may indicate that the second status data ST2 stored in the status data region 115 is not stored in the non-volatile memory device 120.

At a time point T5, the controller 110 may receive a first status data transmission request STR1 from the host device 200.

At a time point T6, in response to the first status data transmission request STR1, the controller 110 may provide the host device 200 with the second status data ST2 stored in the status data region 115. Here, because the update flag UF is in the set status, the controller 110 may store the second status data ST2 into the non-volatile memory device 120. The memory system 100 may guarantee the consistency to the host device 200 by storing, into the non-volatile memory device 120, the second status data ST2 that is provided to the host device 200. Further, after storing the second status data ST2 into the non-volatile memory device 120, the controller 110 may clear the update flag UF. Thus, the update flag UF that is cleared may indicate that the second status data ST2 stored in the status data region 115 is also stored in the non-volatile memory device 120.

At a time point T7, the controller 110 may receive a second status data transmission request STR2 from the host device 200.

At a time point T8, in response to the second status data transmission request STR2, the controller 110 may provide the host device 200 with the second status data ST2 stored in the status data region 115. Here, because the update flag UF is in the cleared status, the controller 110 may not store the second status data ST2 into the non-volatile memory device 120. The second status data ST2 is already stored in the non-volatile memory device 120 at the time point T6 and thus the second status data ST2 does not need to be stored again into the non-volatile memory device 120 at the time point T8. Accordingly, for the second status data ST2, the unnecessary back-up operation can be prevented which can improve the performance of the memory system 100 and increase the lifetime of the non-volatile memory device 120.

At a time point T9, the controller 110 may update, to a third status data ST3, the second status data ST2 stored in the status data region 115 and may set the update flag UF.

At a time point T10, the controller 110 may perform a power-off process under the control of the host device 200. The power-off process turns off the power provided to the controller 110.

At a time point T11, because the update flag UF is in the set status, the controller 110 may store the third status data ST3 into the non-volatile memory device 120. In an embodiment, even when the power-off process at the time point T10 is performed due to an abnormal power-off rather than the normal control of the host device 200, the controller 110 at the time point T11 may operate in the same way as the above-described process. In an embodiment, the controller 110 may clear the update flag UF after storing the third status data ST3 into the non-volatile memory device 120.

At a time point T12, the memory system 100 may be powered off.

Figure 3:
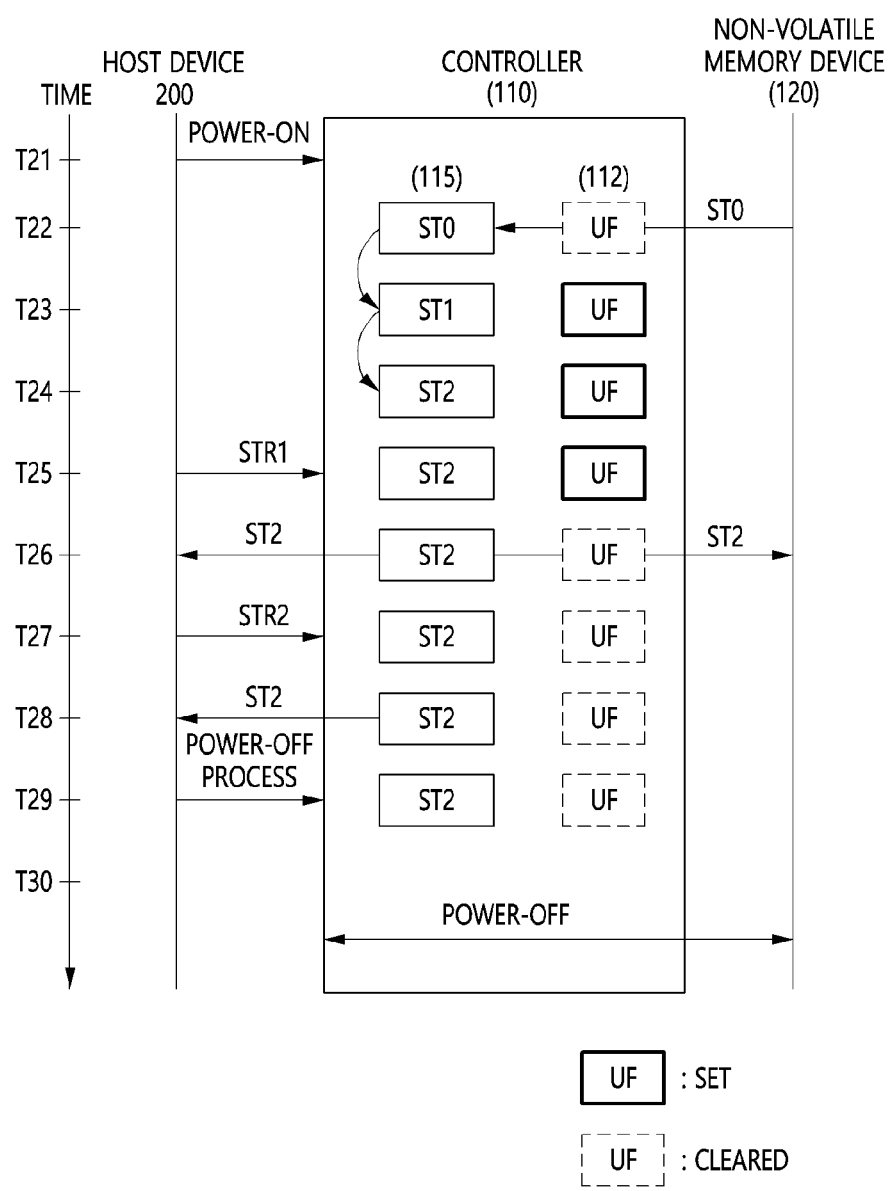
FIG. 3 is a diagram illustrating an operation of the memory system of FIG. 1 in accordance with an embodiment.

FIG. 3 is a diagram illustrating an operation of the memory system 100 of FIG. 1 in accordance with an embodiment.

Referring to FIG. 3, operations at time points T21 to T28 may be the same as the operations as the time points T1 to T8 of FIG. 2.

At a time point T29, the controller 110 may perform the power-off process based on the control of the host device 200. However, the update flag UF is in the cleared status and thus the controller 110 may not store the second status data ST2 into the non-volatile memory device 120, which is different from the operation at the time point T11 of FIG. 2. In this case, the second status data ST2 may be already stored into the non-volatile memory device 120 at the time point T26 and therefore may not be redundantly stored again into the non-volatile memory device 120 at the time point T28.

At a time point T30, the memory system 100 may be powered off.

In an embodiment, at the time point T29, the controller 110 may store, even when the update flag UF is in the cleared status, the second status data ST2 into the non-volatile memory device 120 before the memory system 100 is powered off. Thus, the controller 110 may store, regardless of the status of the update flag UF, the second status data ST2 into the non-volatile memory device 120 during the power-off process.

Figure 4:
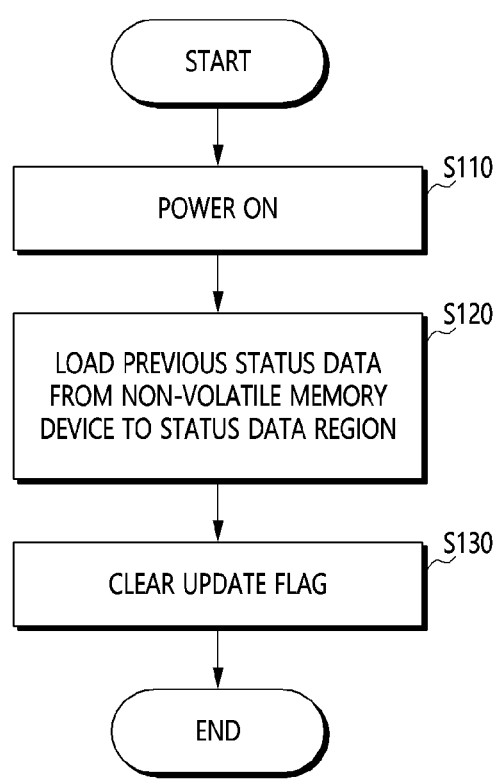
FIG. 4 is a diagram illustrating an operation of the memory system of FIG. 1 in accordance with an embodiment.

FIG. 4 is a diagram illustrating an operation of the memory system 100 of FIG. 1 in accordance with an embodiment. The operation of FIG. 4 may be performed while the memory system 100 is booted up.

Referring to FIG. 4, at step S110, the memory system 100 may be powered on.

At step S120, the controller 110 may load previous status data from the non-volatile memory device 120 into the status data region 115. The previous status data may be the last status data ST that was stored in the non-volatile memory device 120 before the memory system 100 was previously powered off.

At step S130, the controller 110 may clear the update flag UF. The cleared update flag UF may indicate that the status data ST, i.e., the previous status data stored in the status data region 115, is stored in the non-volatile memory device 120.

Figure 5:
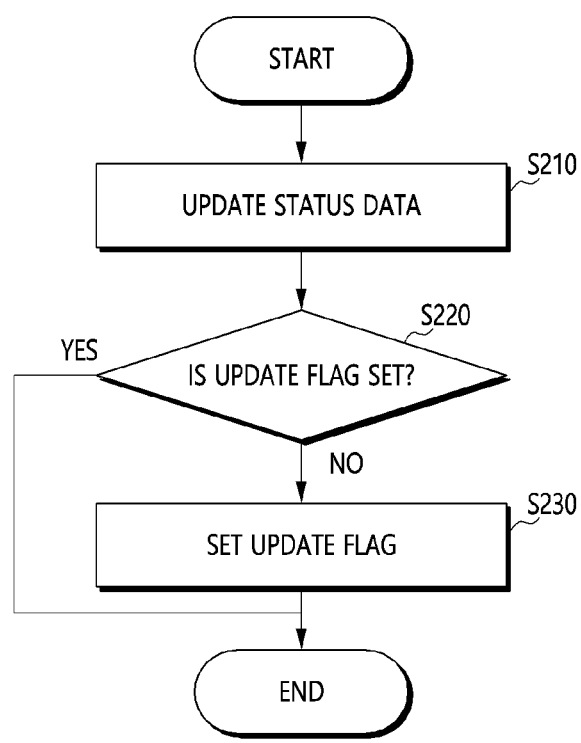
FIG. 5 is a diagram illustrating an operation of the memory system of FIG. 1 in accordance with an embodiment.

FIG. 5 is a diagram illustrating an operation of the memory system 100 of FIG. 1 in accordance with an embodiment.

Referring to FIG. 5, at step S210, the controller 110 may update, during an operation, the status data ST stored in the status data region 115.

At step S220, the controller 110 may check whether the update flag UF is in the set status. When the update flag UF is in the set status, the process may end. Thus, when the update flag UF is already set because of the previous update (i.e., the update at the time point T3) like at the time point T4 of FIG. 2, the process of FIG. 5 may end and the update flag UF may be in the set status. When the update flag UF is not in the set status, the process may proceed to step S230.

At step S230, the controller 110 may set the update flag UF. The set update flag UF may indicate that the status data ST stored in the status data region 115 is different from the status data stored in the non-volatile memory device 120. Thus, the set update flag UF may indicate that the status data ST stored in the status data region 115 is not stored in the non-volatile memory device 120.

Figure 6A:
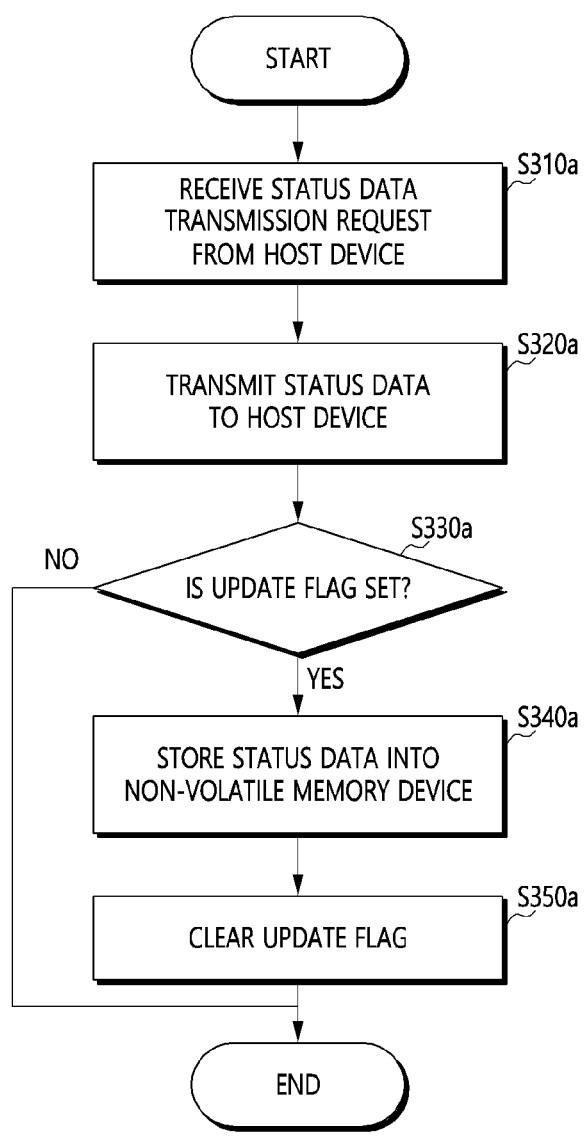
FIGS. 6A to 6C are diagrams each illustrating an operation of the memory system of FIG. 1 in accordance with an embodiment.
Figure 6B:
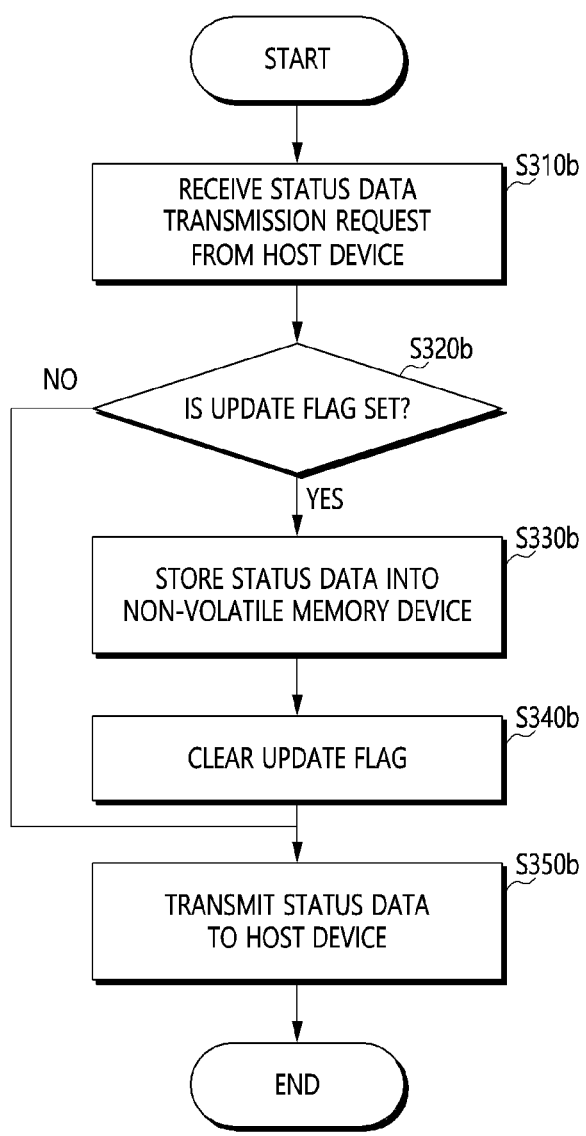
Figure 6C:
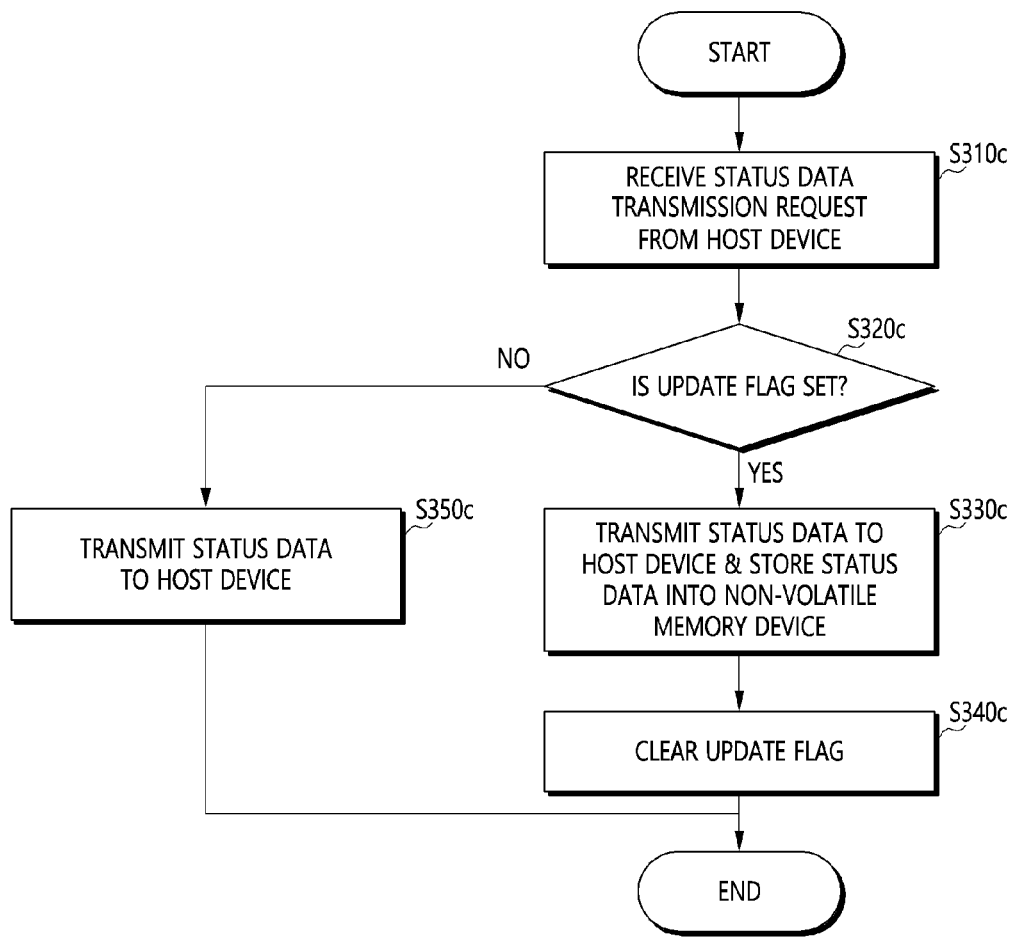

FIGS. 6A to 6C are diagrams each illustrating an operation of the memory system 100 of FIG. 1 in accordance with an embodiment. The operations illustrated in FIGS. 6A to 6C may be different from one another with respect to the time point when the status data ST is provided to the host device 200.

Referring to FIG. 6A, at step S310a, the controller 110 may receive a status data transmission request STR from the host device 200.

At step S320a, the controller 110 may provide the host device 200 with status data ST stored in the status data region 115.

At step S330a, the controller 110 may check whether the update flag UF is in the set status. When the update flag UF is not in the set status, the process may end. When the update flag UF is in the set status, the process may proceed to step S340a.

At step S340a, the controller 110 may store, into the non-volatile memory device 120, the status data ST that is stored in the status data region 115.

At step S350a, the controller 110 may clear the update flag UF.

Referring to FIG. 6B, in an embodiment, the status data ST may be provided to the host device 200 at step S350b after the update flag UF is cleared at step S340b, which is different from the operation of FIG. 6A.

Referring to FIG. 6C, in an embodiment, when the update flag UF is in the set status at step S320c, the controller 110 at step S330c may provide the host device 200 with the status data ST, which is stored in the status data region 115, while storing the status data ST into the non-volatile memory device 120.

When the update flag UF is not in the set status at step S320c, the controller 110 at step S350c may provide the host device 200 with the status data ST, which is stored in the status data region 115.

Figure 7:
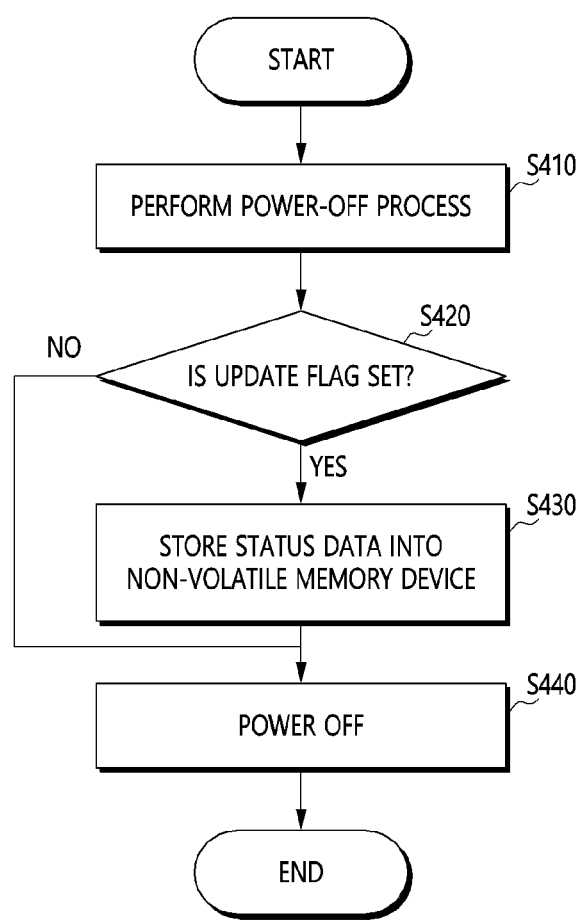
FIG. 7 is a diagram illustrating an operation of the memory system of FIG. 1 in accordance with an embodiment.

FIG. 7 is a diagram illustrating an operation of the memory system 100 of FIG. 1 in accordance with an embodiment.

Referring to FIG. 7, at step S410, the controller 110 may perform a power-off process. For example, the controller 110 may perform the power-off process when receiving a normal power-off signal from the host device 200. For example, the controller 110 may perform the power-off process by utilizing a reserved power in a case of abnormal power-off.

At step S420, the controller 110 may check whether the update flag UF is in the set state. When the update flag UF is in the set state, the process may proceed to step S430. When the update flag UF is not in the set state, the process may proceed to step S440.

At step S430, the controller 110 may store, into the non-volatile memory device 120, the status data ST that is stored in the status data region 115. In an embodiment, the controller 110 may store the status data ST into the non-volatile memory device 120 and then may clear the update flag UF.

At step S440, the memory system 100 may be powered off.

In accordance with an embodiment, the memory system and an operating method of the memory system may be capable of effectively backing up important data.

Figure 8:
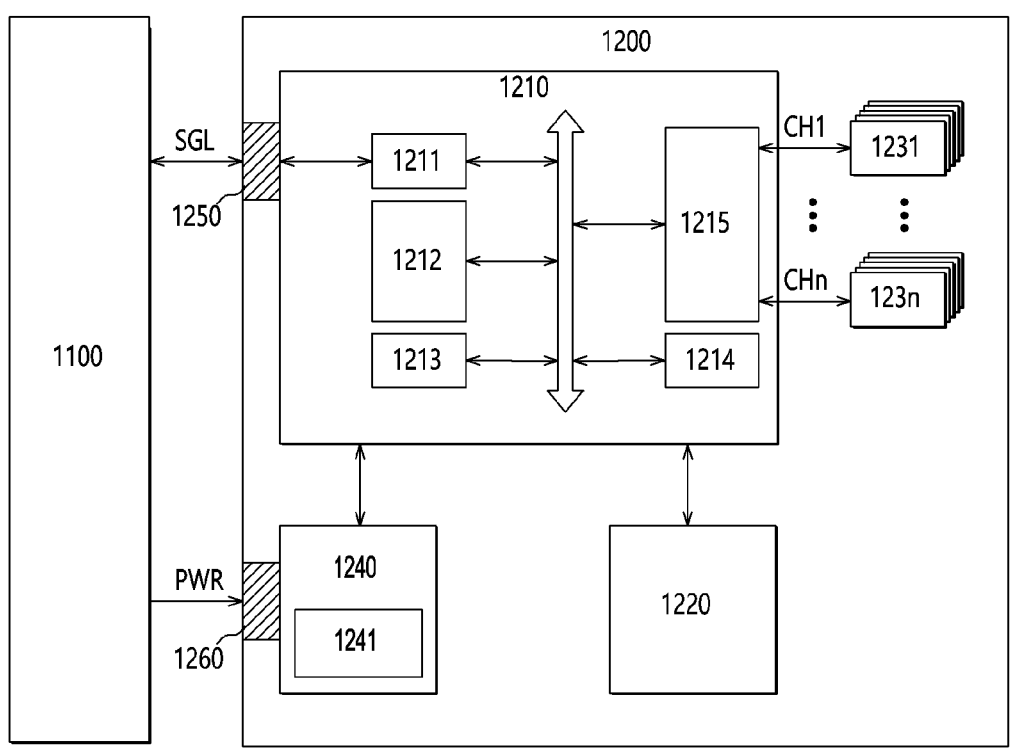
FIG. 8 is a diagram illustrating a data processing system including a solid state drive (SSD) in accordance with an embodiment.

FIG. 8 is a diagram illustrating a data processing system 1000 including a solid state drive (SSD) 1200 in accordance with an embodiment. Referring to FIG. 8, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may operate in the same manner as the controller 110 shown in FIG. 1. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
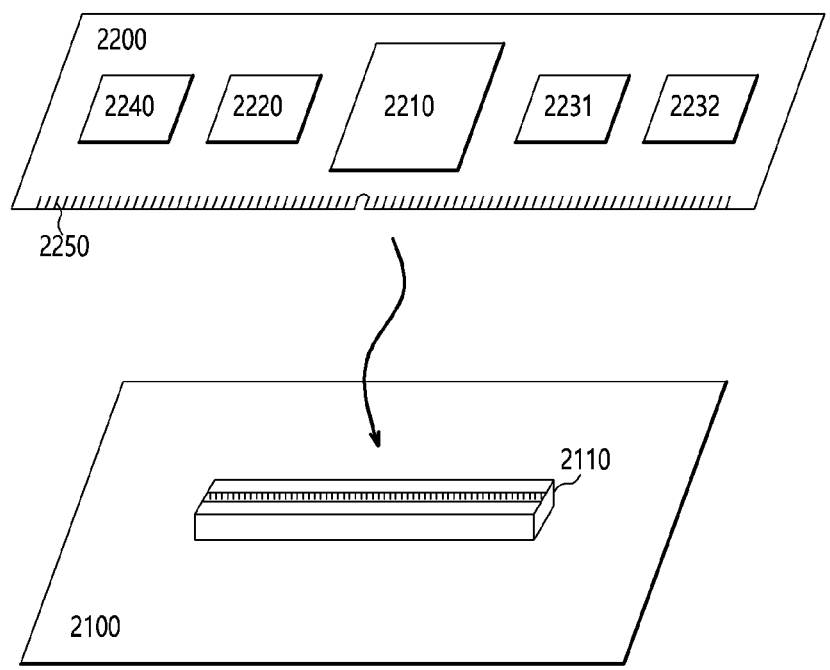
FIG. 9 is a diagram illustrating a data processing system including a memory system in accordance with an embodiment.

FIG. 9 is a diagram illustrating a data processing system 2000 including a memory system 2200 in accordance with an embodiment. Referring to FIG. 9, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 8.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 10:
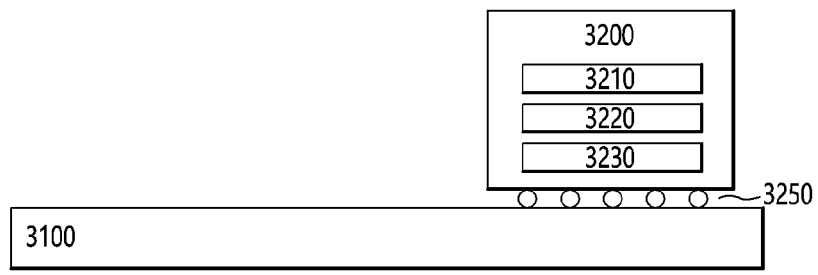
FIG. 10 is a diagram illustrating a data processing system including a memory system in accordance with an embodiment.

FIG. 10 is a diagram illustrating a data processing system 3000 including a memory system 3200 in accordance with an embodiment. Referring to FIG. 10, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 8.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 11:
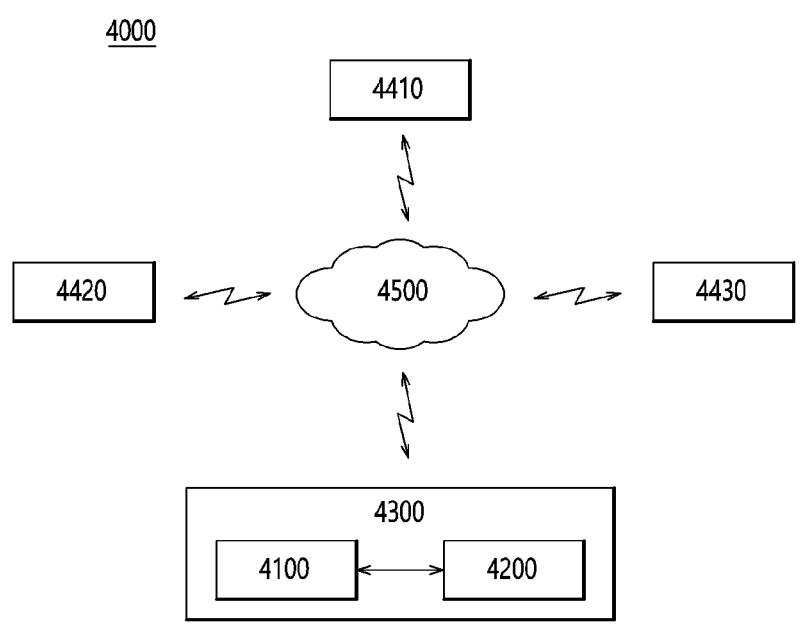
FIG. 11 is a diagram illustrating a network system including a memory system in accordance with an embodiment.

FIG. 11 is a diagram illustrating a network system 4000 including a memory system 4200 in accordance with an embodiment. Referring to FIG. 11, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the SSD 1200 shown in FIG. 8, the memory system 2200 shown in FIG. 9 or the memory system 3200 shown in FIG. 10.

Figure 12:
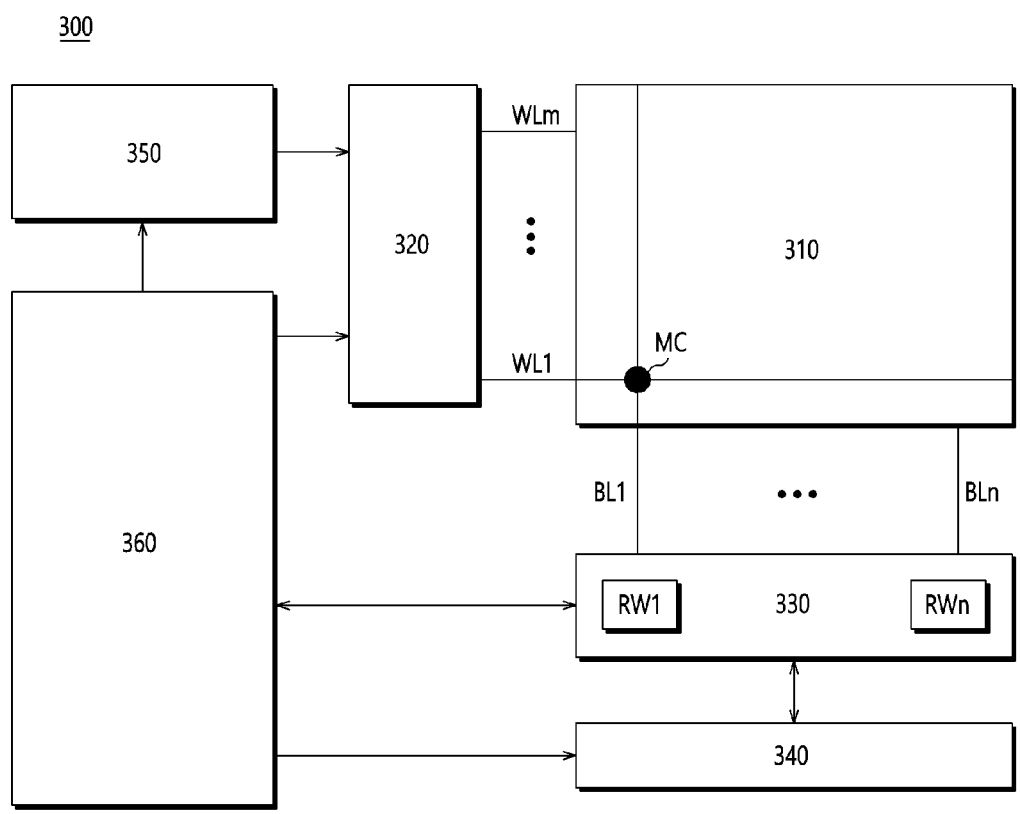
FIG. 12 is a block diagram illustrating a nonvolatile memory device included in a memory system in accordance with an embodiment.

FIG. 12 is a block diagram illustrating a nonvolatile memory device 300 included in a memory system in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. In another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While certain embodiments have been described above, it will be understood to those skilled in the art that the embodiments described are by way of example only. Accordingly, the memory system and operating method thereof should not be limited based on the described embodiments. Rather, variations and enhancements of the disclosed embodiments and other embodiments of the memory system and operating method thereof described herein can be made based on what is disclosed in this patent document.

What is claimed is:

1. A memory system comprising:
a non-volatile memory device structured to store data; and
a controller in communication with the non-volatile memory device to control writing data in, and reading data from, the non-volatile memory device, and including a memory, wherein the controller is configured to store status data stored in the memory into the non-volatile memory device in case that an update flag indicates that the status data stored in the memory has been updated and to skip storing of the status data stored in the memory into the non-volatile memory device in case that the update flag indicates that the status data stored in the memory has not been updated, in response to a status data transmission request provided from an external device and instructing a transfer of the status data from the memory to the external device.

2. The memory system of claim 1, wherein the controller is configured to store the update flag as a first value in response to updating the status data stored in the memory and configured to store the update flag as a second value in response to storing the status data stored in the memory into the non-volatile memory device.

3. The memory system of claim 2, wherein the controller is configured to skip storing the status data stored in the memory into the non-volatile memory device when the update flag is at the second value.

4. The memory system of claim 1, wherein the controller is configured to provide the status data stored in the memory to the external device in response to the status data transmission request.

5. The memory system of claim 1, wherein, after the memory system is powered on, the controller is configured to load previous status data, which is stored in the non-volatile memory device, into the memory and to subsequently store the update flag indicating that the status data stored in the memory has not been updated.

6. The memory system of claim 1, wherein the controller is configured to store, during a power-off process, the status data stored in the memory into the non-volatile memory device in case that the update flag indicates that the status data stored in the memory has been updated.

7. The memory system of claim 1,
wherein the controller further includes an update flag region configured to store the update flag,
wherein the memory includes a status memory region configured to store the status data, and
wherein the update flag region and the status memory region are hard-wired to each other.

8. A memory system comprising:
a non-volatile memory device structured to store data; and
a controller in communication with the non-volatile memory device to control writing data in, and reading data from, the non-volatile memory device and configured to provide, in response to a status data transmission request provided from an external device, current status data to the external device, configured to store the current status data into the non-volatile memory device in case that an update flag indicates that the current status data is different from previous status data that is previously provided to the external device, and configured not to store the current status data into the non-volatile memory device in case that the update flag indicates that the current status data is same as the previous status data.

9. The memory system of claim 8, wherein the controller is configured to store the update flag as a first value in response to updating the previous status data to the current status data.

10. The memory system of claim 9, wherein the controller is configured to store the update flag as a second value in response to storing the current status data into the non-volatile memory device.

11. The memory system of claim 9,
wherein the controller includes an update flag region configured to store the update flag and a status memory region configured to store the current status data, and
wherein the update flag region and the status memory region are hard-wired to each other.

12. A method for operating a memory system, the method comprising:
checking an update flag, in response to a status data transmission request provided from an external device and instructing a transfer of status data stored in a memory to the external device; and
determining to store the status data stored in the memory into a non-volatile memory device in case that the update flag indicates that the status data stored in the memory has been updated and to skip storing of the status data stored in the memory into the non-volatile memory device in case that the update flag indicates that the status data stored in the memory has not been updated.

13. The method of claim 12, further comprising storing the update flag as a first value in response to updating the status data stored in the memory.

14. The method of claim 12, further comprising storing the update flag as a second value in response to storing the status data stored in the memory into the non-volatile memory device.

15. The method of claim 12, further comprising providing the external device with the status data stored in the memory in response to the status data transmission request.

16. The method of claim 12, further comprising, after the memory system is powered on, loading previous status data from the non-volatile memory device into the memory and storing the update flag indicating that the status data stored in the memory has not been updated, the previous status data stored in the non-volatile memory device before the memory system was powered off.

17. The method of claim 12, further comprising storing, during a power-off process, the status data stored in the memory into the non-volatile memory device in case that the update flag indicates that the status data stored in the memory has been updated.

* * * * *